United States Patent
Huang et al.

(10) Patent No.: US 11,989,004 B2
(45) Date of Patent: May 21, 2024

(54) LAMINATION PLANNING METHOD FOR LAMINATE MOLDED OBJECT, AND LAMINATE MOLDED OBJECT MANUFACTURING METHOD AND MANUFACTURING DEVICE

(71) Applicant: KOBE STEEL, LTD., Hyogo (JP)

(72) Inventors: Shuo Huang, Hyogo (JP); Takeshi Yamada, Hyogo (JP); Shinji Sato, Hyogo (JP); Masatoshi Hida, Hyogo (JP); Tatsuya Fujii, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 358 days.

(21) Appl. No.: 17/632,883

(22) PCT Filed: Aug. 5, 2020

(86) PCT No.: PCT/JP2020/030011
§ 371 (c)(1),
(2) Date: Feb. 4, 2022

(87) PCT Pub. No.: WO2021/029297
PCT Pub. Date: Feb. 18, 2021

(65) Prior Publication Data
US 2022/0269242 A1  Aug. 25, 2022

(30) Foreign Application Priority Data

Aug. 9, 2019 (JP) ................. 2019-147432
Aug. 9, 2019 (JP) ................. 2019-147433

(51) Int. Cl.
*G05B 19/4099* (2006.01)
*B33Y 50/00* (2015.01)
*B23K 9/04* (2006.01)

(52) U.S. Cl.
CPC .......... *G05B 19/4099* (2013.01); *B33Y 50/00* (2014.12); *B23K 9/044* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 6,191,379 B1 * | 2/2001 | Offer | B23K 26/1429 219/137 R |
| 2016/0059493 A1 | 3/2016 | Sparks et al. | |
| 2020/0038983 A1 | 2/2020 | Sato et al. | |

FOREIGN PATENT DOCUMENTS

| | | |
|---|---|---|
| CN | 107999753 A | 5/2018 |
| JP | 2004-004034 A | 1/2004 |
| JP | 2018-162500 A | 10/2018 |

OTHER PUBLICATIONS

Robert, Pascal, Matthieu Museau, and Henri Paris. "Effect of temperature on the quality of welding beads deposited with CMT technology." 2018 IEEE international conference on industrial engineering and engineering management (IEEM). IEEE, 2018. (Year : 2018).*

(Continued)

*Primary Examiner* — Carlos R Ortiz Rodriguez
(74) *Attorney, Agent, or Firm* — Studebaker & Brackett PC

(57) ABSTRACT

A building time for building an additively-manufactured object is calculated on the basis of the inter-pass time and the welding pass time and is compared with a preset upper limit value, and welding conditions in a depositing plan are repeatedly modified until the building time is equal to or less than the upper limit value. Alternatively, corrections are repeatedly performed until the shape difference between a building shape of built-up object shape data relating to the (Continued)

additively-manufactured object created on the basis of the inter-pass time and the inter-pass temperature, and a building shape of three-dimensional shape data, is smaller than a near net value.

11 Claims, 8 Drawing Sheets

(56) References Cited

OTHER PUBLICATIONS

Montevecchi Filippo et al., "Idle time selection for wire-arc additive manufacturing: A finite element-based technique", Additive Manufacturing, vol. 21, May 1, 2018, pp. 479-486.

Donghong Ding et al., "A practical path planning methodology for wire and arc additive manufacturing of thin-walled structures", Robotics and Computer Integrated Manufacturing., vol. 34, Aug. 1, 2015, pp. 8-19.

The partial supplementary European search report (R. 164 EPC) issued by the European Patent Office on Sep. 26, 2022, which corresponds to European Patent Application No. 208531673-1103 and is related to U.S. Appl. No. 17/632,883.

The extended European search report issued by the European Patent Office on Dec. 19, 2022, which corresponds to European Patent Application No. 208531673-1103 and is related to U.S. Appl. No. 17/632,883.

Denlinger Erik R. et al: "Effect of stress relaxation on distortion in additive manufacturing process modeling", Additive Manufacturing, vol. 12, Oct. 1, 2016, pp. 51-59.

Haibin Geng et al: "Optimisation of interpass temperature and heat input for wire and arc additive manufacturing 5A06 aluminium alloy", Science and Technology of Welding and Joining, vol. 22, No. 6, Nov. 23, 2016, pp. 472-483.

Huang Hui et al: "Toward large-scale simulation of residual stress and distortion in wire and arc additive manufacturing", Additive Manufacturing, vol. 34, Aug. 1, 2020, 101248. pp. 1-13.

Zhao Huihui et al: "Effects of Interpass Idle Time on Thermal Stresses in Multipass Multilayer Weld-Based Rapid Prototyping", Journal of Manufacturing Science and Engineering, vol. 135, No. 1, Feb. 1, 2013, 6 pages.

* cited by examiner

LAMINATION PLANNING METHOD FOR LAMINATE MOLDED OBJECT, AND LAMINATE MOLDED OBJECT MANUFACTURING METHOD AND MANUFACTURING DEVICE

TECHNICAL FIELD

The present invention relates to a depositing planning method for an additively-manufactured object, and a method and an apparatus for manufacturing an additively-manufactured object.

BACKGROUND ART

In recent years, there has been an increasing need for building using a 3D printer as a production unit, and research and development have been advanced toward practical use of building using a metal material. A 3D printer that builds a metal material melts a metal powder or a metal wire using a heat source such as a laser, an electron beam, or an arc, and deposits the molten metal to manufacture an additively-manufactured object.

In addition, as a technique for predicting a temperature of a welded portion, for example, Patent Literature 1 describes that welding conditions such as a cooling rate are adjusted by changing an inter-pass temperature, which is an allowable temperature of the welded portion when welding of a next pass is started, and an amount of heat input to various values.

CITATION LIST

Patent Literature

Patent Literature 1: JP-A-2004-4034

SUMMARY OF INVENTION

Technical Problem

In multilayer welding in which beads are deposited, a welding temperature is monitored under predetermined construction conditions (a plate thickness, the number of passes, a current, a voltage, a speed, an arc time, and the like), data of waiting time to a predetermined inter-pass temperature is acquired by experiments, and the inter-pass temperature is managed based on the acquired data.

However, when a built-up object having a complicated shape is manufactured by additive manufacturing, the shape changes with an increase in the number of deposited layers, and thus the overall heat capacity and heat conduction change. In addition, the welding conditions may be changed in the middle of building depending on the shape of the built-up object. Therefore, in the method for managing the inter-pass temperature described above, it is necessary to collect data by performing a large amount of experiments in order to obtain an appropriate waiting time. For example, in the case where the number of welding passes is several hundred, experiments take very much time and effort, which is unrealistic. In addition, if the inter-pass temperature is too high, dripping and the like occurs in the bead, and the bead shape collapses. If the inter-pass temperature is too low, the waiting time for cooling to the inter-pass temperature becomes long, and as a result, a manufacturing time of the built-up object becomes long. In addition, since the inter-pass temperature changes depending on a welding material, a base metal, and a welding method, it is difficult to appropriately manage the inter-pass temperature. Then, in the technique described in Patent Literature 1 in which grooves of the base metal are welded, it is difficult to appropriately manage the inter-pass temperature in the additive manufacturing.

In addition, in the technique of the additive manufacturing, since the material is melted and solidified to perform the building, the built-up object is thermally contracted and deformed, and an error may occur with respect to a target shape. Furthermore, when processing such as cutting or annealing is performed on the built-up object or a base plate is removed, strain may be generated due to release of a thermal stress remaining inside the built-up object, and the built-up object may be deformed.

Accordingly, a first object of the present invention is to provide a depositing planning method for an additively-manufactured object, and a method and an apparatus for manufacturing an additively-manufactured object, which are capable of appropriately managing an inter-pass temperature and building a built-up object in an optimum building time.

In addition, a second object of the present invention is to provide a depositing planning method for an additively-manufactured object, and a method and an apparatus for manufacturing an additively-manufactured object, which are capable of appropriately managing an inter-pass temperature and building a built-up object in consideration of the influence of heat.

Solution to Problem

The present invention has the following configuration.
(1) A depositing planning method for an additively-manufactured object, to build an additively-manufactured object using three-dimensional shape data of the additively-manufactured object by an additive manufacturing apparatus for depositing a weld bead on a base plate, in which
a computer executes:
a step of acquiring the three-dimensional shape data;
a step of creating a depositing plan that defines a welding pass for forming each layer obtained by dividing a shape of the three-dimensional shape data into layers using the weld bead, and a welding condition for forming the weld bead;
a step of setting an inter-pass time from an end of a welding pass to a start of a next welding pass for a plurality of the welding passes, and calculating an inter-pass temperature by performing heat transfer calculation in the inter-pass time;
a step of determining whether the inter-pass temperature falls within a preset inter-pass temperature range, adjusting the inter-pass time until the inter-pass temperature falls within the inter-pass temperature range, and repeating the heat transfer calculation;
a step of calculating a building time required for building the additively-manufactured object according to the inter-pass time when the inter-pass temperature falling within the inter-pass temperature range is calculated and a welding pass time required for forming the weld bead in the welding pass; and
a step of repeatedly correcting, by comparing the building time with a preset upper limit value, the welding condition in the depositing plan until the building time becomes equal to or less than the upper limit value.
(2) A depositing planning method for an additively-manufactured object, to build an additively-manufactured object using three-dimensional shape data of the additively-manufactured object by an additive manufacturing apparatus for depositing a weld bead on a base plate, in which a computer executes:

a step of acquiring the three-dimensional shape data;

a step of creating a depositing plan that defines a welding pass for forming each layer obtained by dividing a shape of the three-dimensional shape data into layers using the weld bead, and a welding condition for forming the weld bead;

a step of setting an inter-pass time from an end of a welding pass to a start of a next welding pass for a plurality of the welding passes, and calculating an inter-pass temperature by performing heat transfer calculation in the inter-pass time;

a step of determining whether the inter-pass temperature falls within a preset inter-pass temperature range, repeating the heat transfer calculation until the inter-pass temperature falls within the inter-pass temperature range, and adjusting the inter-pass time;

a step of creating built-up object shape data of the additively-manufactured object during thermal contraction according to the inter-pass time and the inter-pass temperature calculated by the heat transfer calculation, and calculating a shape difference between a building shape of the built-up object shape data and a building shape of the three-dimensional shape data; and a step of comparing the shape difference with a preset appropriate value, creating corrected three-dimensional shape data corrected according to the shape difference until the shape difference is smaller than the appropriate value, and repeating steps from the creation of the depositing plan to the calculation of the built-up object shape data.

(3) A method for manufacturing an additively-manufactured object, including:

manufacturing the additively-manufactured object based on the depositing plan created by the depositing planning method for the additively-manufactured object according to (1) or (2).

(4) An apparatus for manufacturing an additively-manufactured object, to build the additively-manufactured object by depositing a weld bead on a base plate using three-dimensional shape data of the additively-manufactured object, the apparatus including:

an input unit configured to acquire the three-dimensional shape data;

a depositing plan creation unit configured to create a depositing plan that defines a welding pass for forming each layer obtained by dividing a shape of the three-dimensional shape data into layers using the weld bead, and a welding condition for forming the weld bead;

a temperature prediction unit configured to set an inter-pass time from an end of a welding pass to a start of a next welding pass for a plurality of the welding passes, and calculate an inter-pass temperature by performing heat transfer calculation in the inter-pass time;

an inter-pass temperature adjustment unit configured to determine whether the inter-pass temperature falls within a preset inter-pass temperature range, change the inter-pass time until the inter-pass temperature falls within the inter-pass temperature range, and repeat the heat transfer calculation;

a building time estimation unit configured to calculate a building time required for building the additively-manufactured object according to the inter-pass time when the inter-pass temperature falling within the inter-pass temperature range is calculated and a welding pass time required for forming the weld bead in the welding pass; and a welding condition adjustment unit configured to repeatedly change, by comparing the building time with a preset upper limit value, the welding condition in the depositing plan until the building time becomes equal to or less than the upper limit value.

(5) An apparatus for manufacturing an additively-manufactured object, to build the additively-manufactured object by depositing a weld bead on a base plate using three-dimensional shape data of the additively-manufactured object, the apparatus including:

an input unit configured to acquire the three-dimensional shape data;

a depositing plan creation unit configured to create a depositing plan that defines a welding pass for forming each layer obtained by dividing a shape of the three-dimensional shape data into layers using the weld bead, and a welding condition for forming the weld bead;

a temperature prediction unit configured to set an inter-pass time for a plurality of the welding passes, and calculate an inter-pass temperature by performing heat transfer calculation in the inter-pass time;

an inter-pass temperature adjustment unit configured to determine whether the inter-pass temperature falls within a preset inter-pass temperature range, repeat the heat transfer calculation until the inter-pass temperature falls within the inter-pass temperature range, and adjust the inter-pass time;

a deformation amount calculation unit configured to create built-up object shape data of the additively-manufactured object during thermal contraction according to the inter-pass time and the inter-pass temperature calculated after the heat transfer calculation is completed, and calculate a shape difference between a building shape of the built-up object shape data and a building shape of the three-dimensional shape data; and a shape difference adjustment unit configured to compare the shape difference with a preset appropriate value, create corrected three-dimensional shape data corrected according to the shape difference until the shape difference is smaller than the appropriate value, and repeat steps from the creation of the depositing plan to the calculation of the built-up object shape data.

Advantageous Effects of Invention

According to the present invention, it is possible to appropriately manage an inter-pass temperature and build a built-up object in an optimum building time. In addition, it is possible to appropriately manage an inter-pass temperature and build a built-up object in consideration of the influence of heat.

DESCRIPTION OF EMBODIMENTS

Hereinafter, embodiments of the present invention will be described in detail with reference to the drawings.

<Apparatus for Manufacturing Additively-Manufactured Object>

Figure 1:
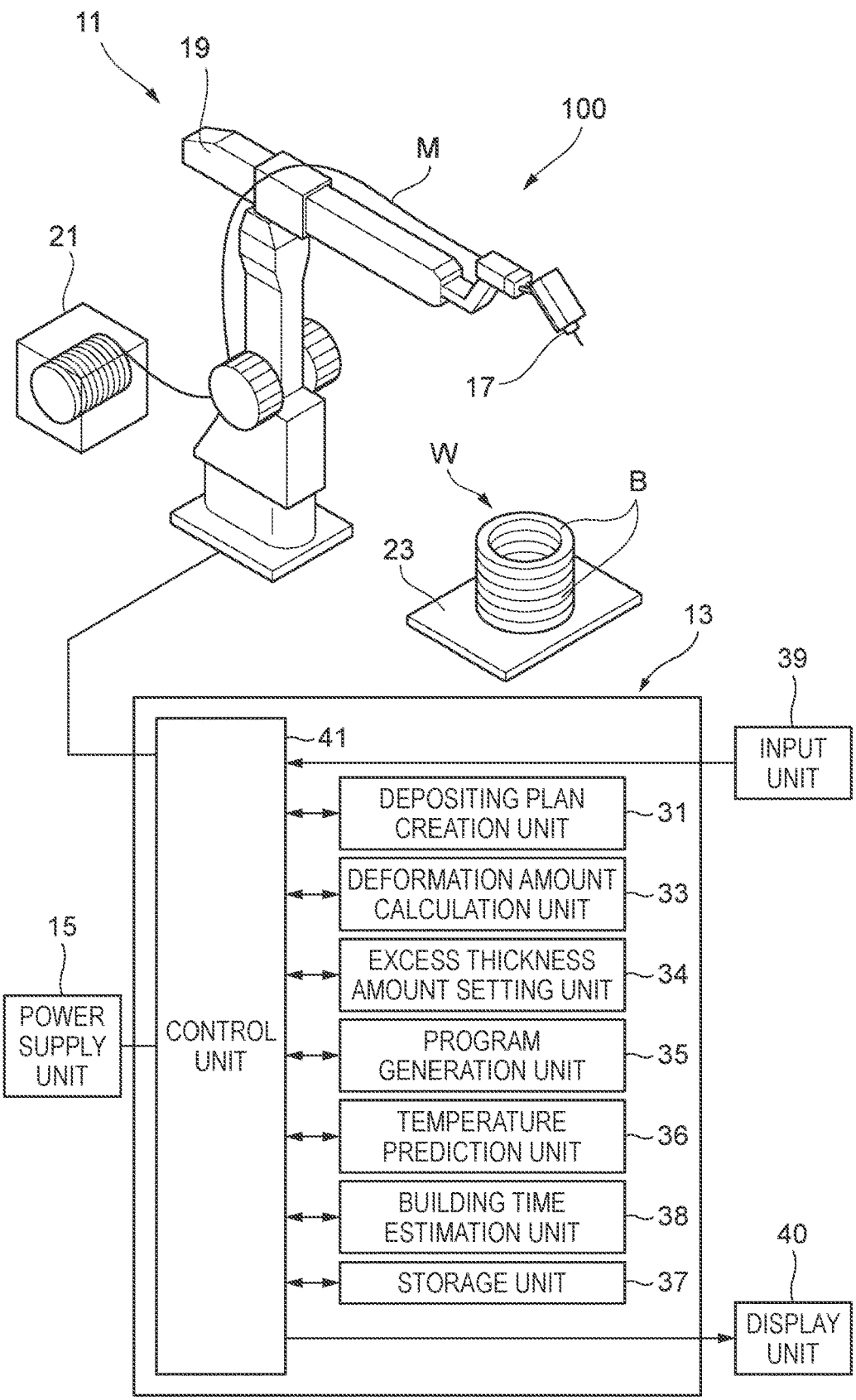
FIG. 1 is a schematic configuration diagram of an apparatus for manufacturing an additively-manufactured object according to the present invention.

FIG. 1 is a schematic configuration diagram of an apparatus for manufacturing an additively-manufactured object according to the present invention.

A manufacturing apparatus 100 for manufacturing an additively-manufactured object of the present configuration includes a building unit 11, a controller 13 that integrally controls the building unit 11, and a power supply unit 15.

The building unit 11 includes a welding robot 19 in which a torch 17 is provided on a tip shaft, and a filler metal supply unit 21 that supplies a filler metal (welding wire) M to the torch 17.

The welding robot 19 is an articulated robot, and the filler metal M is supported by the torch 17 attached to the tip shaft of a robot arm so as to be continuously suppliable. The position or posture of the torch 17 can be set three-dimensionally desirably within a range of the degree of freedom of the robot arm.

The torch 17 generates an arc from the tip of the filler metal M in a shielding gas atmosphere while holding the filler metal M. The torch 17 includes a shield nozzle (not shown), and a shielding gas is supplied from the shield nozzle. An arc welding method may be either a consumable electrode type such as shielded metal arc welding or carbon dioxide gas arc welding, or a non-consumable electrode type such as TIG welding or plasma arc welding, and the arc welding method is appropriately selected depending on the additively-manufactured object to be manufactured.

For example, in the case of the consumable electrode type, a contact tip is disposed inside the shield nozzle, and the filler metal M to which a melting current is to be supplied is held on the contact tip. The torch 17 generates an arc from the tip of the filler metal M in a shielding gas atmosphere while holding the filler metal M. The filler metal M is fed from the filler metal supply unit 21 to the torch 17 by a delivery mechanism (not shown) attached to the robot arm and the like. Then, when the filler metal M fed continuously is melted and solidified while moving the torch 17, a linear weld bead B, which is a melt-solidified body of the filler metal M, is formed on a base plate 23.

The filler metal M is fed from the filler metal supply unit 21 to the torch 17 by the delivery mechanism (not shown) attached to the robot arm and the like of the welding robot 19. Then, the torch 17 moves along a desired welding line when the robot arm is driven by a command from the controller 13. In addition, the continuously fed filler metal M is melted and solidified in a shielding gas atmosphere by an arc generated at the tip of the torch 17. Accordingly, the weld bead B, which is the melt-solidified body of the filler metal M, is formed. As described above, the building unit 11 is an additive manufacturing apparatus that deposits the molten metal of the filler metal M, and builds an additively-manufactured object W by depositing the weld bead B in a multilayer shape on the base plate 23.

A heat source for melting the filler metal M is not limited to the arc described above. A heat source using another system such as a heating system using an arc and a laser together, a heating system using a plasma or a heating system using an electron beam or a laser may be used. In the case of using an arc, a weld bead B can be easily formed regardless of a raw material and a structure while ensuring shielding properties. In the case of heating by an electron beam or a laser, a heating amount can be controlled more finely to keep each weld bead B in a more proper state, thereby contributing to further improvement in quality of the additively-manufactured object W.

The controller 13 includes a depositing plan creation unit 31, a deformation amount calculation unit 33, an excess thickness amount setting unit 34, a program generation unit 35, a temperature prediction unit 36, a building time estimation unit 38, a storage unit 37, an input unit 39, a display unit 40, and a control unit 41 to which these units are connected. Three-dimensional shape data (CAD data and the like) representing the shape of the additively-manufactured object W to be manufactured and various types of instruction information are input to the control unit 41 from the input unit 39. The display unit 40 displays various types of information corresponding to signals transmitted from the control unit 41.

The manufacturing apparatus 100 for the additively-manufactured object of the present configuration generates a shape model for bead formation using the input three-dimensional shape data, and creates a depositing plan such as a movement trajectory of the torch 17 and welding conditions. The control unit 41 creates an operation program according to the depositing plan, and drives each unit according to the operation program to perform additive manufacturing of the additively-manufactured object W having a desired shape.

The depositing plan creation unit 31 disassembles the shape model of the input three-dimensional shape data into a plurality of layers according to a height of the weld bead B. Then, for each layer of the disassembled shape model, a depositing plan is created which defines a trajectory of the torch 17 for forming the weld bead B and heating conditions (including the welding conditions for obtaining a bead width, a bead depositing height, and the like) for forming the weld bead B.

The deformation amount calculation unit 33 analytically obtains the deformation amount caused by releasing a residual stress of the additively-manufactured object W when a mechanical opening and the like is performed on the additively-manufactured object W built according to the depositing plan.

The excess thickness amount setting unit 34 sets an excess thickness amount serving as a machining allowance from a structure W1 after machine working to an outer edge of the additively-manufactured object W.

The program generation unit 35 creates an operation program that causes a computer to execute a procedure of driving each unit of the building unit 11 to build the additively-manufactured object W. The created operation program is stored in the storage unit 37.

The temperature prediction unit 36 includes a pre-prediction unit such as heat transfer calculation, which will be described in detail later, and performs temperature management of a weld beam by performing temperature prediction before building. In addition, the building time estimation unit 38 estimates in advance a building time required for building the additively-manufactured object W, which will be described in detail later.

In addition to the operation program being stored in the storage unit 37, specifications of various driving units included in the building unit 11, information on the material of the filler metal M, and the like are also stored in the storage unit 37. The stored information is appropriately referred to when the operation program is created by the program generation unit 35, when the operation program is executed, and the like.

The controller 13 including the control unit 41 is implemented by a computer including a processor such as a CPU, a memory such as a ROM or a RAM, a storage such as a hard disk drive (HDD) or a solid state drive (SSD), an I/O interface, and the like. The controller 13 has a function of reading data and a program stored in the storage unit 37, executing data processing including analysis processing and an operation program, and a function of driving and controlling each unit of the building unit 11. The control unit 41 creates and executes various operation programs based on an instruction from the input unit 39 through an operation, communication, and the like.

When the control unit 41 executes the operation program, each unit such as the welding robot 19 and the power supply unit 15 is driven according to a predetermined programmed procedure. The welding robot 19 moves the torch 17 along a programmed trajectory in response to the command from the controller 13, and melts the filler metal M using an arc at a predetermined timing to form the weld bead B at a desired position.

The operation program referred to here is an command code for causing the building unit 11 to perform a formation procedure of the weld bead B designed by predetermined calculation from the input three-dimensional shape data of the additively-manufactured object W. The control unit 41 causes the additively-manufactured object W to be manufactured by the building unit 11 by executing the operation program stored in the storage unit 37. That is, the control unit 41 reads a desired operation program from the storage unit 37, moves the torch 17 by driving the welding robot 19 according to the operation program, and generates an arc from the tip of the torch 17. Accordingly, the weld bead B is repeatedly formed on the base plate 23, and the additively-manufactured object W is built.

Each calculation unit such as the depositing plan creation unit 31, the deformation amount calculation unit 33, the excess thickness amount setting unit 34, the program generation unit 35, the temperature prediction unit 36, and the building time estimation unit 38 is provided in the controller 13, but is not limited thereto. Although not illustrated, for example, the above-described calculation unit may be provided in an external computer such as a server or a terminal disposed separately from the manufacturing apparatus 100 for the additively-manufactured object via a communication unit such as a network. By providing the above-described calculation unit in the external computer, it is possible to create the desired operation program without requiring the manufacturing apparatus 100 for the additively-manufactured object, and a program creation operation is not complicated. In addition, by transferring the created operation program to the storage unit 37 of the controller 13 via a network or a storage medium, the building unit 11 can be operated in the same manner as when the operation program is created by the controller 13.

<Basic Procedure of Additive Manufacturing>

Next, a procedure of additive manufacturing will be briefly described using a simple model of the additively-manufactured object W.

Figure 2:
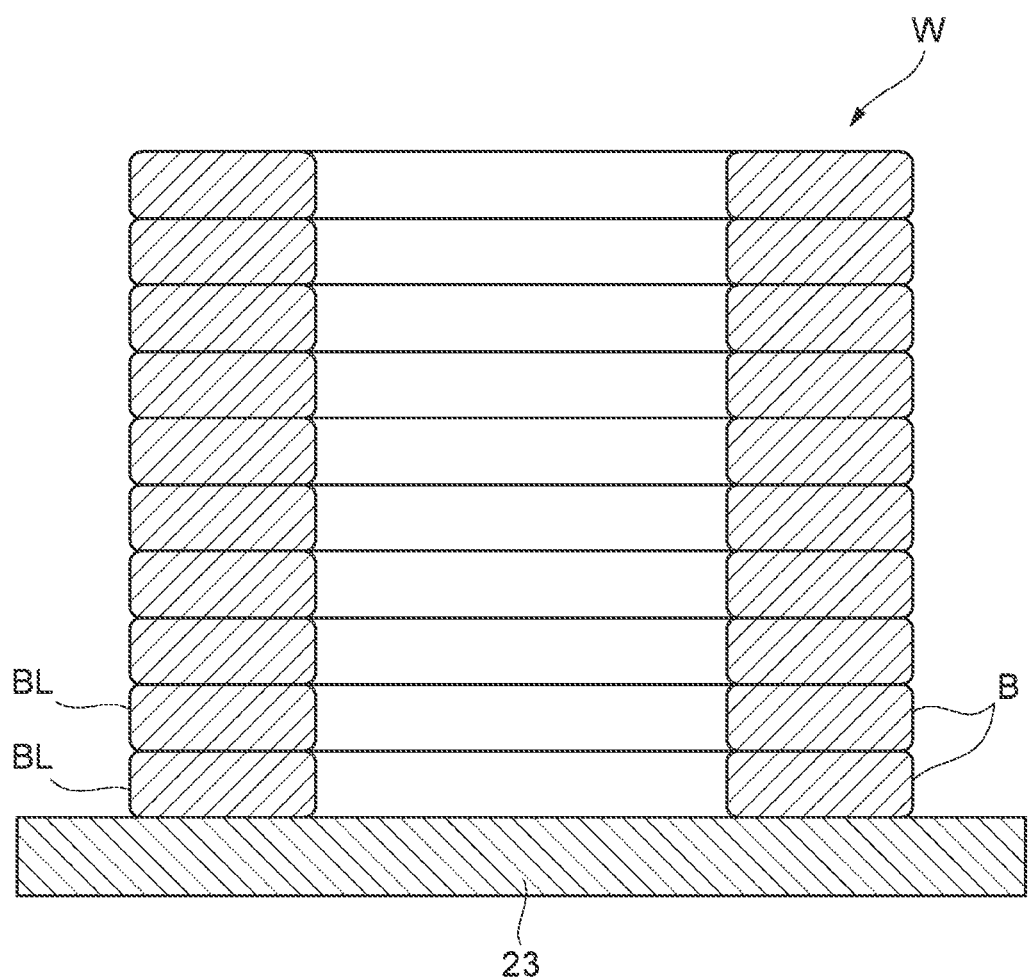
FIG. 2 is a schematic cross-sectional view of the additively-manufactured object cut in a vertical direction.
Figure 3A:
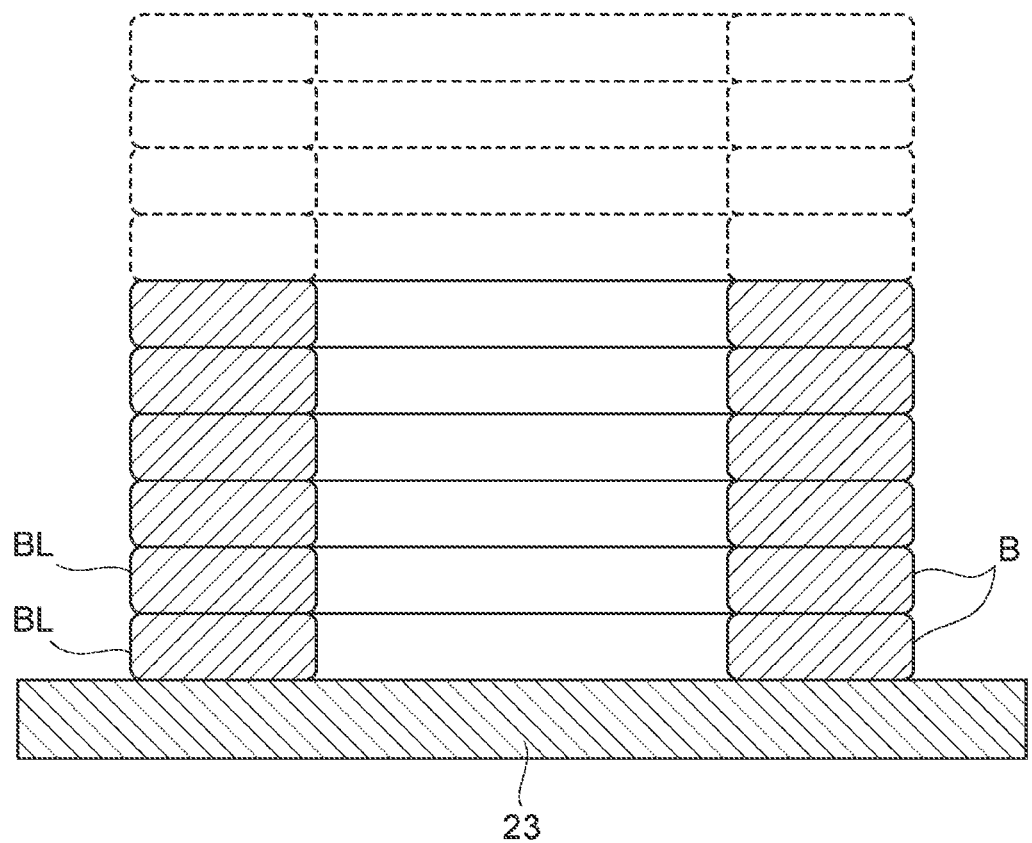
FIG. 3A is a process explanatory view showing a basic procedure of additive manufacturing of the additively-manufactured object, and is a schematic cross-sectional view of the additively-manufactured object cut in the vertical direction.
Figure 3B:
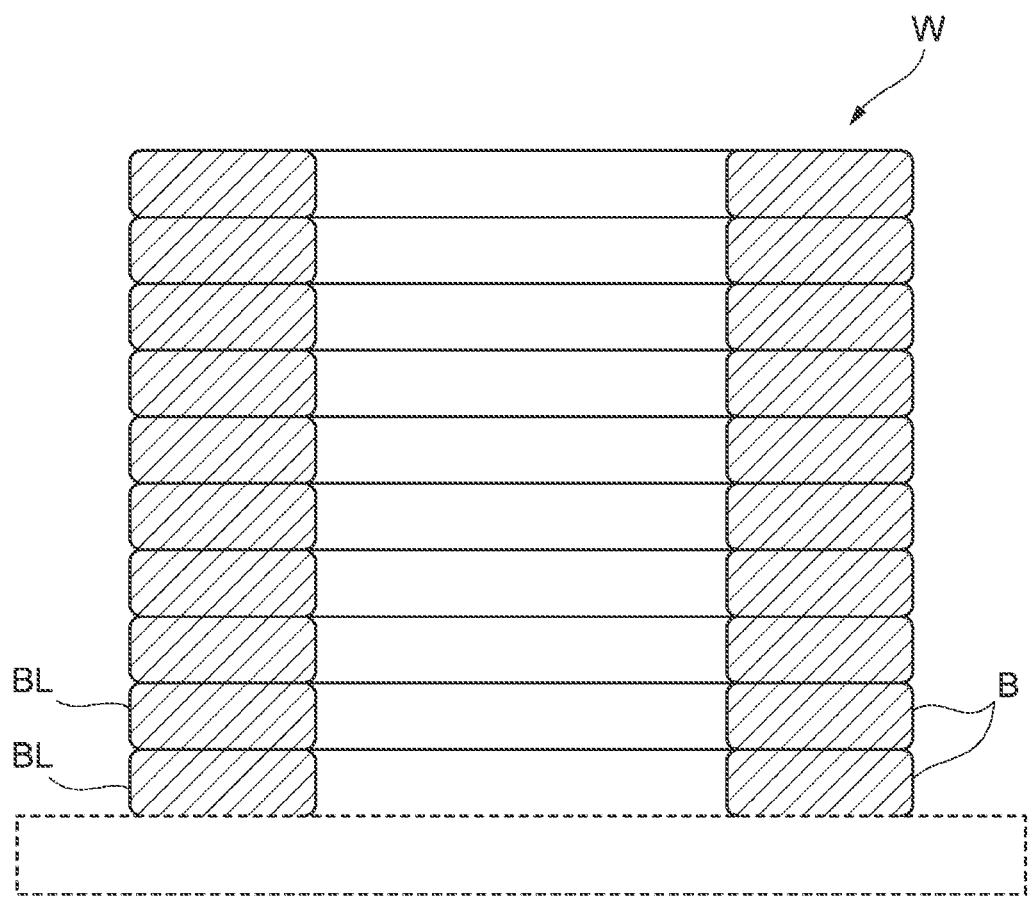
FIG. 3B is a process explanatory view showing the basic procedure of the additive manufacturing of the additively-manufactured object, and is a schematic cross-sectional view of the additively-manufactured object cut in the vertical direction.
Figure 3C:
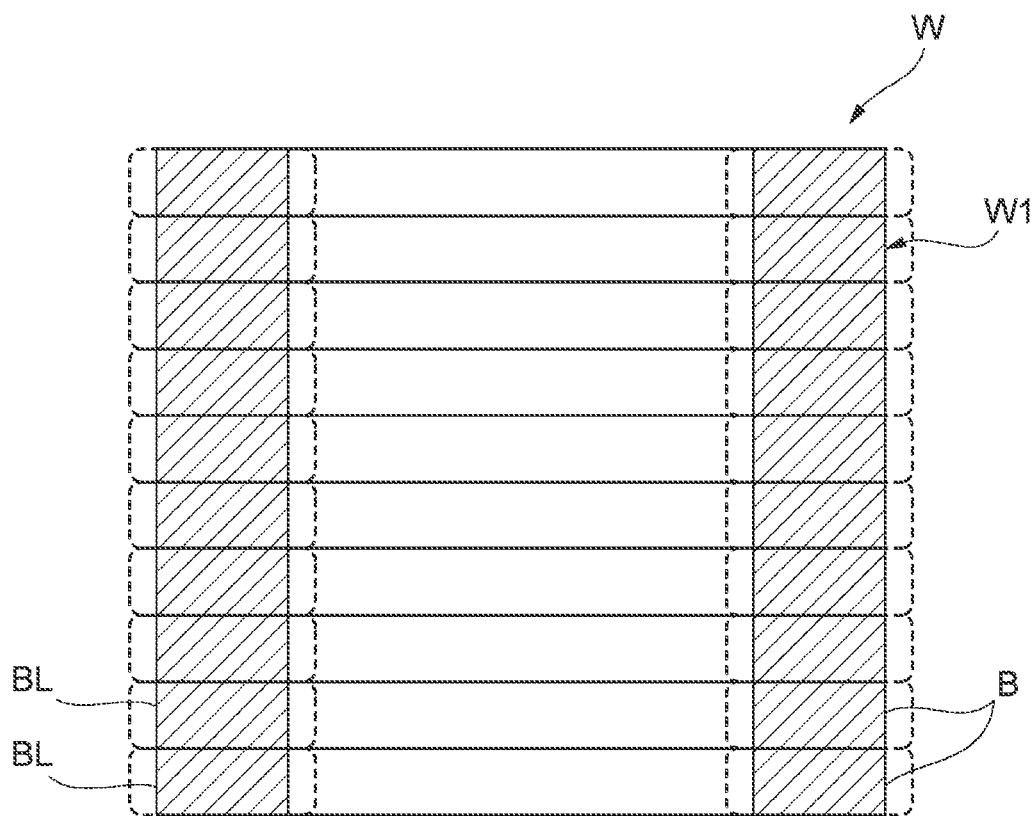
FIG. 3C is a process explanatory view showing the basic procedure of the additive manufacturing of the additively-manufactured object, and is a schematic cross-sectional view of the additively-manufactured object cut in the vertical direction.

FIG. 2 is a schematic cross-sectional view of the additively-manufactured object W cut in a vertical direction. FIGS. 3A to 3C are process explanatory views illustrating a basic procedure of the additive manufacturing of the additively-manufactured object W, and are schematic cross-sectional views of the additively-manufactured object W cut in the vertical direction.

The additively-manufactured object W illustrated as an example in FIG. 2 is formed in a cylindrical shape on the base plate 23. The base plate 23 is formed of a metal plate such as a steel plate, and is basically larger than a bottom surface (surface of the lowermost layer) of the additively-manufactured object W. The base plate 23 is not limited to a plate shape, and may be a base of another shape such as a block body or a rod shape.

As illustrated in FIG. 3A, in order to build the additively-manufactured object W, the welding robot 19 moves the torch 17 along an instructed trajectory on the base plate 23 disposed in advance according to the operation program. The weld bead B is formed along the trajectory of the torch 17 by generating an arc at the tip of the torch 17 along with the movement of the torch 17. The weld bead B is formed by melting and solidifying the filler metal M. Then, a bead layer BL of the next layer is repeatedly deposited on the formed bead layer BL by the same operation as described above.

As illustrated in FIG. 3B, after the additively-manufactured object W is built on the base plate 23, the base plate 23 is cut by a cutting machine such as a wire saw or a diamond cutter to separate the base plate 23 and the additively-manufactured object W, and the base plate 23 is removed. Thereafter, as illustrated in FIG. 3C, for example, an excess thickness portion set by the excess thickness amount setting unit 34 is cut from the additively-manufactured object W and processed into a product. The base plate 23 may be removed after the excess thickness portion is cut from the additively-manufactured object W.

<First Depositing Plan of Additively-Manufactured Object>

Next, a first depositing planning method for building an additively-manufactured object will be described.

Here, when the additively-manufactured object W as described above is built by the deposition of the weld bead B, an inter-pass temperature of the weld bead B is appropriately managed, and a depositing plan for building the additively-manufactured object W at an optimum building time is created.

Figure 4:
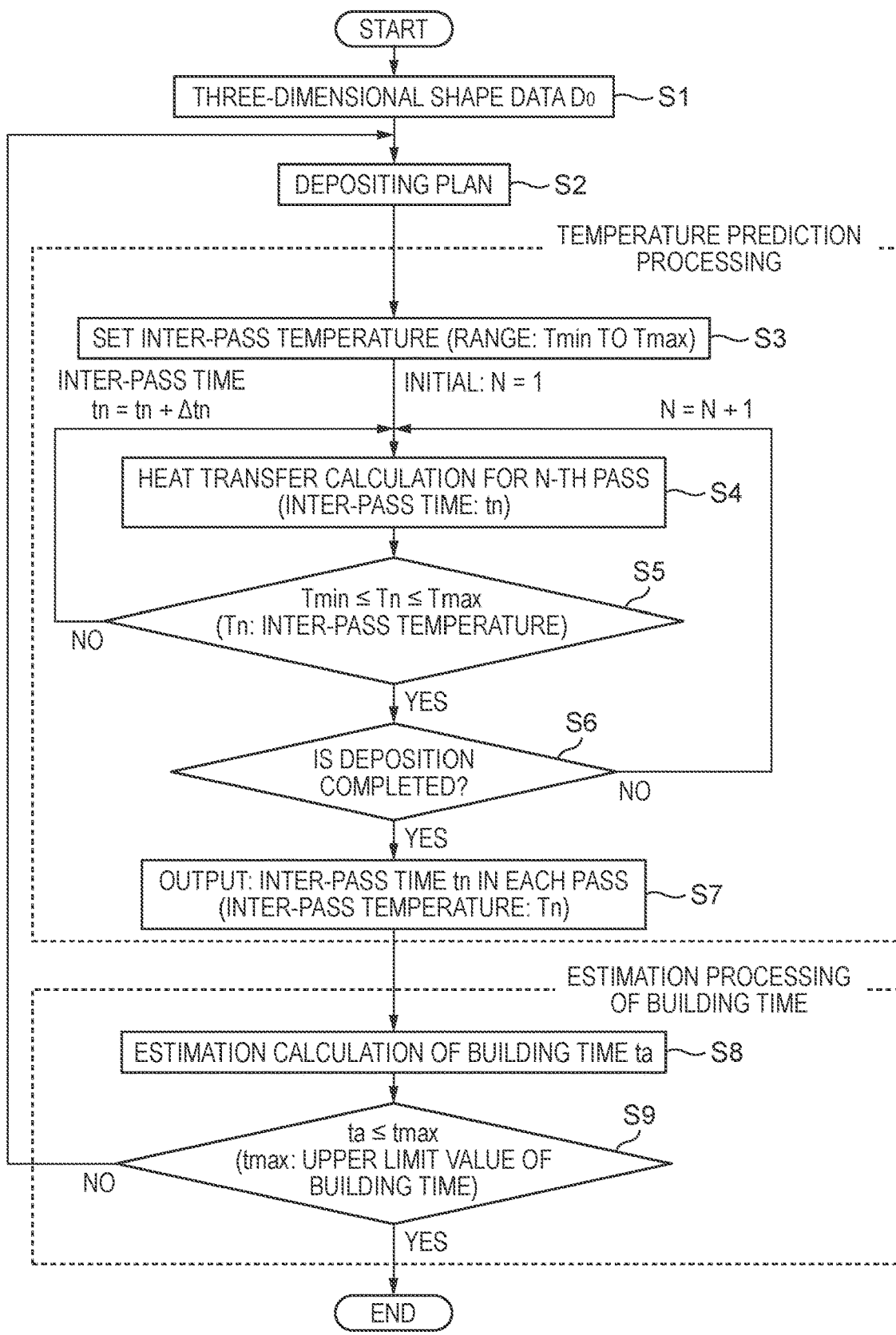
FIG. 4 is a flowchart showing a procedure of a first depositing plan of the additively-manufactured object.

FIG. 4 is a flowchart showing a procedure of a first depositing plan of the additively-manufactured object.

First, the controller 13 acquires three-dimensional shape data $D_0$, which is CAD data of an additively-manufactured object to be built, from the input unit 39 (S1).

The depositing plan creation unit 31 of the controller 13 determines a building shape according to the acquired three-dimensional shape data $D_0$, creates a depositing plan for forming the building shape using the weld bead B, and determines a condition for forming the weld bead B (S2). The condition determination includes creating a trajectory plan for determining a welding pass (a trajectory of the torch) for moving the torch 17, and setting various welding conditions such as a welding current, an arc voltage, a travel speed, and a torch angle when forming the weld bead B using an arc as a heating source.

Specifically, the building shape of the additively-manufactured object W is determined based on the three-dimensional shape data $D_0$, the building shape is divided into a plurality of the bead layers (ten layers in the present example) BL in a vertical direction, and a welding pass for moving the torch 17 is obtained respectively corresponding to each bead layer BL. The welding pass is determined by calculation based on a predetermined algorithm. Information of the welding pass includes, for example, information of a path such as spatial coordinates of the path along which the torch 17 is moved, a radius of the path, and a path length, bead information such as a bead width and a bead height of the weld bead B to be formed, and the like. A height of the bead layer BL is determined according to the height of the weld bead B set by the welding conditions.

After the depositing plan is created, temperature prediction processing (S3 to S7) is performed by the temperature prediction unit 36.

First, an inter-pass time tn, which is a waiting time from the end of one welding pass to the start of the next welding pass, is set for the welding pass in the depositing plan. In addition, in the inter-pass time tn, a minimum value Tmin and a maximum value Tmax of an allowable inter-pass temperature are preset (S3).

Next, an inter-pass temperature Tn in each welding pass in the inter-pass time tn is calculated by performing heat transfer calculation, which will be described in detail later (S4).

It is determined whether the calculated inter-pass temperature Tn in each welding pass falls within the allowable inter-pass temperature range Tmin to Tmax (S5). When the inter-pass temperature Tn is out of the inter-pass temperature range Tmin to Tmax (S5: No), heat transfer is calculated and the inter-pass temperature Tn is calculated by changing the inter-pass time tn again such that the inter-pass temperature Tn falls within the inter-pass temperature range Tmin to Tmax (S4).

In this way, the inter-pass time tn is changed and the heat transfer calculation is repeated until the inter-pass temperature Tn falls within the inter-pass temperature range Tmin to Tmax for all the divided bead layers BL (S6). The processing is executed by the temperature prediction unit 36 having a function of an inter-pass temperature adjustment unit that repeats the heat transfer calculation.

When the inter-pass temperature Tn falls within the inter-pass temperature range Tmin to Tmax for all the divided bead layers BL (S6: Yes), the inter-pass time tn and the inter-pass temperature Tn in each welding pass are output to the control unit 41 (S7).

Here, it is preferable to use a method with a high calculation speed for the heat transfer calculation by the temperature prediction unit 36. The heat transfer calculation may be performed using a three-dimensional heat conduction equation. The temperature prediction unit 36 performs temperature prediction using, for example, the following basic equation (1).

[Equation 1]

$$^{t+\Delta t}\{H\} = {}^{t}\{H\} - \Delta t[C][K]^{t}\{T\} - \Delta t[C]^{t}\{F\} + \Delta t^{t}\{Q\} \quad (1)$$

Here, in the basic equation (1),
H: enthalpy
C: reciprocal of node volume
K: heat conduction matrix
F: heat flux
Q: volume heat generation.

In the three-dimensional heat conduction equation, welding heat input may be applied to a welding region in accordance with the travel speed. In addition, when the weld bead is short, heat input may be applied to the entire one bead.

After the temperature prediction unit 36 outputs the inter-pass time tn and the inter-pass temperature Tn to the control unit 41, the building time estimation unit 38 performs estimation processing of the following building time (S8 and S9).

The building time estimation unit 38 receives the inter-pass time tn and the inter-pass temperature Tn in each welding pass for all the divided bead layers BL from the control unit 41. Then, according to the calculated inter-pass time tn and a welding pass time tpn required to form the weld bead in the welding pass, a building time ta required to build the additively-manufactured object W is calculated from the following calculation equation (2) (S8). That is, an integrated value of the inter-pass time tn is added to the welding pass time tpn to estimate the total building time ta of additively-manufactured object W. The building time ta may include an operation time of the welding robot 19.

[Equation 2]

$$ta = \sum_{i=1}^{N} tp(i) + \sum_{i=1}^{N-1} tn(i+1) \quad (2)$$

Here, in the calculation equation (2),
ta: total building time
tp(i): welding time of welding pass of i-th layer
tn(i+1): time between welding pass of i-th layer and pass of (i+1)-th layer.

After the building time ta is calculated by the calculation equation (2), the building time ta is compared with a preset upper limit value tmax (S9). The upper limit value tmax is a time set in consideration of the productivity of the additively-manufactured object W, and is, for example, a time limit of the time required for building the additively-manufactured object W.

That is, when the building time ta exceeds the upper limit value tmax (S9: No), the productivity of the additively-manufactured object W is low, and thus it is determined that improvement is necessary. In this case, a depositing plan is created again (S2), and based on the created depositing plan, the temperature prediction processing (S3 to S7) and the estimation processing (S8 and S9) of the building time ta are performed. The processing is executed by the building time estimation unit 38 having the function of the welding condition adjustment unit that repeatedly changes the welding conditions.

Accordingly, the correction of the depositing plan (S2), the temperature prediction processing (S3 to S7), and the estimation processing of the building time ta (S8 and S9) are repeated until the building time ta becomes equal to or less than the upper limit value tmax.

Here, the correction of the depositing plan is a correction of increasing a building speed, and for example, the correction of the welding conditions, the change of the deposition order of the weld bead B, and the like are performed. When the welding conditions are corrected, any one of the travel speed, the number of passes, and the shape (the bead width and the bead height) of the weld bead B is corrected. For example, the bead shape (the bead width and the bead height) of each condition may be stored in a database in advance in the storage unit 37, and the welding conditions corresponding to a target shape dimension and the building time ta may be selected.

As described above, according to the first depositing planning method for the additively-manufactured object, the inter-pass time tn is set for a plurality of welding passes, the inter-pass temperature Tn is calculated by performing the heat transfer calculation in the inter-pass time tn, it is determined whether the inter-pass temperature Tn falls within the preset inter-pass temperature range Tmin to Tmax, and the inter-pass time is adjusted by repeating the heat transfer calculation until the inter-pass temperature Tn falls within the inter-pass temperature range Tmin to Tmax. Then, the building time ta for building the additively-manufactured object W is calculated according to the inter-pass time to calculated by the heat transfer calculation and the welding pass time tpn. Further, the building time ta is compared with the preset upper limit value tmax, and the welding conditions in the depositing plan are repeatedly corrected until the building time ta becomes equal to or less than the upper limit value tmax. Therefore, the building time ta can be shortened by changing the welding conditions in the depositing plan while appropriately managing the inter-pass temperature Tn of the welding pass during forming of the weld bead B.

In particular, the building time ta can be efficiently shortened by changing the travel speed, the number of passes, and the bead shape of the welding conditions.

Accordingly, the additively-manufactured object W can be manufactured by shortening the building time ta while appropriately managing the inter-pass temperature Tn of the welding pass during the forming of the weld bead B.

Incidentally, in an additive manufacturing method in which the additively-manufactured object W is built by depositing the weld bead B on the base plate 23, the material is melted and solidified to build the additively-manufactured object W. Therefore, a residual stress may be generated inside the additively-manufactured object W due to thermal contraction and the like. Then, when cutting, annealing, or removal of the base plate 23 is performed on the additively-manufactured object W, deformation occurs due to release of the residual stress, and an error occurs with respect to a target shape. In order to reduce the error with respect to the target shape, cutting and the like is performed after an excess thickness amount is set to be large. However, when the excess thickness amount is set in consideration of the release strain, the building time increases.

Therefore, in the manufacturing apparatus 100 for the additively-manufactured object of the present configuration, the deformation amount calculation unit 33 predicts a deformation amount caused by the thermal contraction of the additively-manufactured object W, the excess thickness amount setting unit 34 adjusts an excess thickness amount Δ based on the predicted deformation amount, and the building time estimation unit 38 corrects the building time ta based on the adjustment of the excess thickness amount Δ.

Hereinafter, a case where the building time ta is corrected by adjusting the excess thickness amount Δ will be described.

Figure 5:
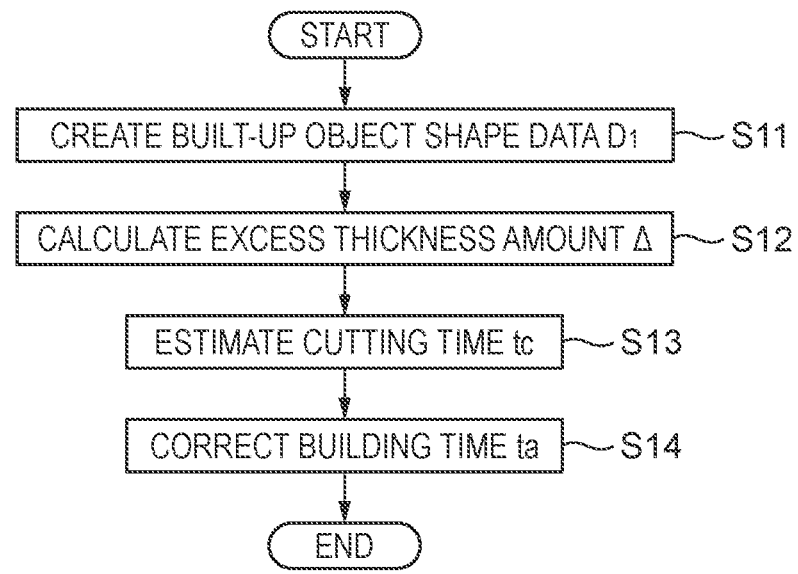
FIG. 5 is a flowchart showing a procedure of a second depositing plan of the additively-manufactured object in consideration of thermal contraction.

FIG. 5 is a flowchart showing a procedure of a second depositing plan of an additively-manufactured object in consideration of thermal contraction.

When the inter-pass time tn and the inter-pass temperature Tn in each welding pass for all the divided bead layers BL are output, the deformation amount calculation unit 33 predicts the deformation amount of the additively-manufactured object W according to the calculated inter-pass time tn and inter-pass temperature Tn, and creates built-up object shape data $D_1$ of the additively-manufactured object W during the thermal contraction (S11).

Building shapes of the built-up object shape data $D_1$ and the three-dimensional shape data $D_0$ are compared, and the excess thickness amount setting unit 34 calculates the excess thickness amount Δ based on the difference therebetween (S12).

Further, based on the calculated excess thickness amount Δ, the building time estimation unit 38 estimates a cutting time tc required when the additively-manufactured object W is machined into the shape of the structure W1 (S13).

Thereafter, the building time ta obtained in the building time estimation processing (S8, S9) is corrected to the building time ta to which the estimated cutting time tc is added (S14).

Accordingly, the excess thickness amount Δ, which is a portion to be cut after the weld bead B is deposited, can be appropriately calculated, and the total building time ta including the cutting time tc required for cutting the excess thickness portion can be reduced.

Here, welding deformation and a residual stress of an additively-manufactured object are generally analyzed by thermoelastic plastic analysis method using a finite element method (FEM) or computer simulation using elastic analysis and the like.

In the thermoelastic plastic analysis method, since a phenomenon is calculated in consideration of various non-linear elements for each of a large number of minute time steps, the analysis can be performed with high accuracy. On the other hand, in the elasticity analysis, since the analysis is performed in consideration of only a linear element, the analysis can be performed in a short time When the additively-manufactured object W is built by additive manufacturing in which the weld bead B is deposited, all portions of the additively-manufactured object W undergo a melting and solidification process of a metal. When the metal is melted and solidified, inherent strain (plastic strain, thermal strain) occurs in the additively-manufactured object W. The residual stress due to the inherent strain is generated inside the additively-manufactured object W. The deformation amount calculation unit 33 analytically obtains a shape change due to such additive manufacturing.

The deformation amount calculation unit 33 may include, for example, a partial model thermoelastic analysis unit and an entire model elastic analysis unit. The partial model thermoelastic analysis unit performs thermoelastic analysis using a partial model of the built-up object based on the input analysis conditions (additive manufacturing conditions and material physical property conditions) to calculate the inherent strain (plastic strain, thermal strain). The entire model elastic analysis unit performs elastic analysis on an entire model of the built-up object based on the calculated inherent strain to derive a residual stress and the like. Conditions used for the analysis include: additive manufacturing conditions using output of a heat source, a type of the heat source, a beam profile, a scanning speed, a scanning sequence, a line offset, a preheating temperature, and the like as parameters; mechanical physical property values such as Young's modulus, a yield strength, a linear expansion coefficient, and a work hardening index of a material; and material physical property conditions such as a thermal physical property value such as thermal conductivity or specific heat.

<Third Depositing Plan of Additively-Manufactured Object>

Next, a third depositing planning method for building an additively-manufactured object will be described.

Here, when the additively-manufactured object W as described above is built by depositing the weld bead B, a depositing plan for building the additively-manufactured object W is created in consideration of the influence of heat by appropriately managing the inter-pass temperature of the weld bead B.

Figure 6:
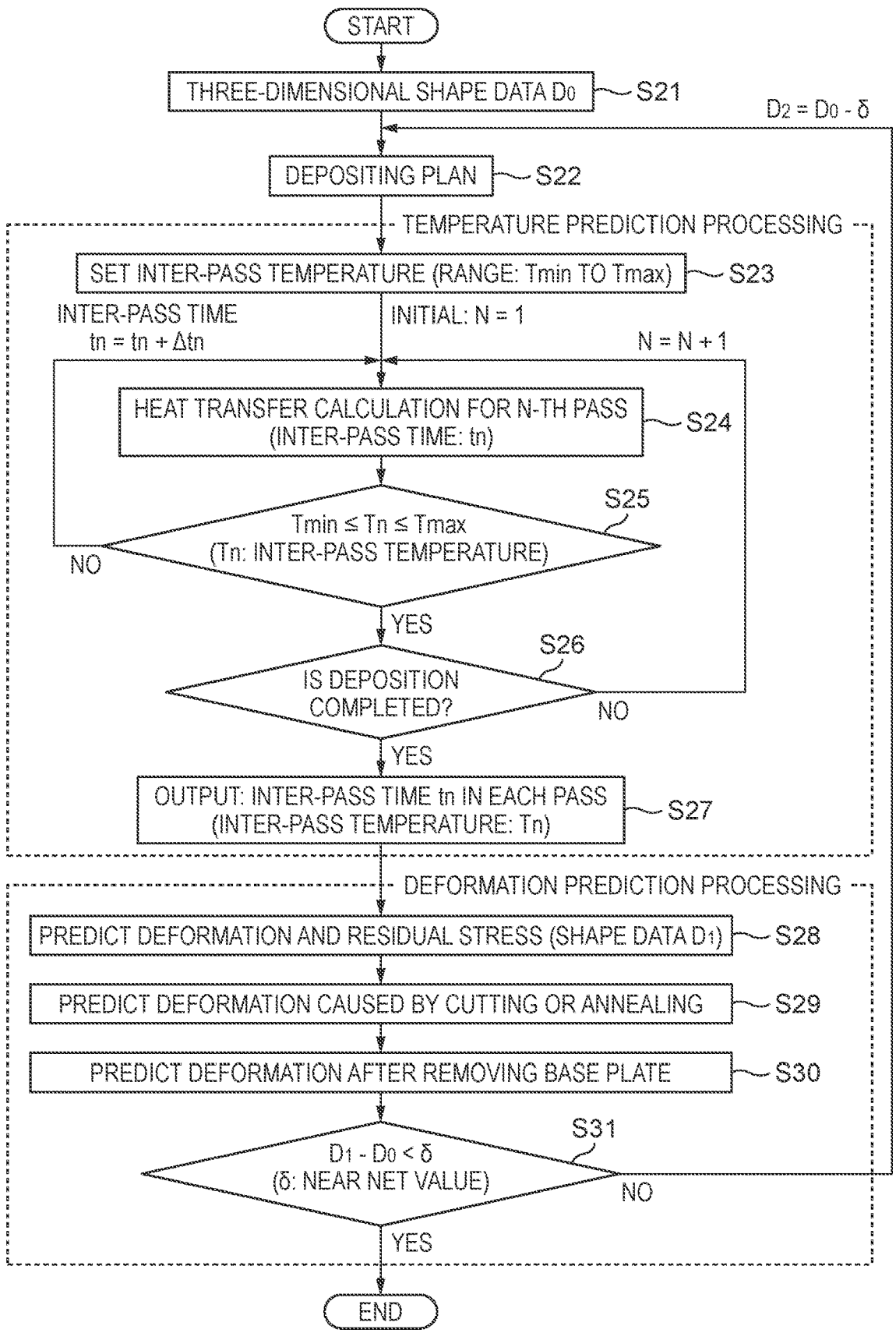
FIG. 6 is a flowchart showing a procedure of a third depositing plan of the additively-manufactured object.

FIG. 6 is a flowchart showing a procedure of the third depositing plan of the additively-manufactured object.

Here, since S21 to S27 of the flowchart of FIG. 6 are the same processing as S1 to S7 of the flowchart shown in FIG. 4 described above, the procedure after S28 will be described in the following description.

In S27, after the temperature prediction unit 36 outputs the inter-pass time tn and the inter-pass temperature Tn to the control unit 41, the deformation amount calculation unit 33 performs the following deformation prediction processing (S28 to S31).

The deformation amount calculation unit 33 receives the inter-pass time tn and the inter-pass temperature Tn in each welding pass for all the divided bead layers BL from the control unit 41. Then, the deformation amount of the additively-manufactured object W is predicted according to the calculated inter-pass time tn and inter-pass temperature Tn, and the built-up object shape data $D_1$ of the additively-manufactured object W during thermal contraction is created (S28).

Next, the deformation amount calculation unit 33 predicts the deformation amount of the additively-manufactured object W due to release strain caused by performing processing such as cutting or annealing on the additively-manufactured object W. Then, the built-up object shape data $D_1$ of the additively-manufactured object W is further corrected based on the predicted deformation amount (S29).

Next, the deformation amount calculation unit 33 predicts the deformation amount of the additively-manufactured object W due to the release strain caused by removing the base plate 23 from the built additively-manufactured object W. Then, the built-up object shape data $D_1$ of the additively-manufactured object W is corrected according to the predicted deformation amount (S30).

Here, a shape difference $(D_1-D_0)$ of the building shape between the corrected built-up object shape data $D_1$ and the three-dimensional shape data $D_0$ is compared with a near net value (appropriate value) $\delta$ which is a preset minimum necessary excess thickness amount (S31). When the shape difference $(D_1-D_0)$ is equal to or larger than the near net value $\delta$ (S31: No), a corrected three-dimensional shape data $D_2$ ($D_2=D_0-\delta$) corrected based on the shape difference is created, and the processes of the creation of the depositing plan (S22), the temperature prediction processing (S23 to S27), and the deformation prediction processing (S28 to S31) are repeatedly performed until the shape difference $(D_1-D_0)$ is smaller than the near net value $\delta$. The processing of creating the corrected three-dimensional shape data corrected according to the shape difference is executed by the deformation amount calculation unit 33 having the function of the shape difference adjustment unit.

In the manufacturing apparatus 100 for the additively-manufactured object described above, when the inter-pass time tn and the inter-pass temperature Tn are output from the temperature prediction unit 36, the building time estimation unit 38 estimates the building time ta required for building the additively-manufactured object W based on the calculated inter-pass time tn and the welding pass time tpn which is the time required for the welding pass. That is, an integrated value of the inter-pass time tn is added to the welding pass time tpn to estimate the total building time ta of additively-manufactured object W. The building time ta may include an operation time of the welding robot 19.

As described above, according to the third depositing planning method for the additively-manufactured object, the inter-pass time tn is set for a plurality of welding passes, the inter-pass temperature Tn is calculated by performing the heat transfer calculation in the inter-pass time tn, it is determined whether the inter-pass temperature Tn falls within the preset inter-pass temperature range Tmin to Tmax, and the inter-pass time is adjusted by repeating the heat transfer calculation until the inter-pass temperature Tn falls within the inter-pass temperature range Tmin to Tmax. Then, the built-up object shape data $D_1$ of the additively-manufactured object W during the thermal contraction is created according to the inter-pass time tn and the inter-pass temperature Tn calculated by the heat transfer calculation, and the shape difference $(D_1-D_0)$ between the building shape of the built-up object shape data $D_1$ and the building shape of the three-dimensional shape data $D_0$ is calculated. Further, the shape difference $(D_1-D_0)$ is compared with the near net value $\delta$ which is a preset appropriate value, the corrected three-dimensional shape data $D_2$ corrected based on the shape difference $(D_1-D_0)$ is created until the shape difference $(D_1-D_0)$ is smaller than the near net value $\delta$, and the processes from the creation of the depositing plan to the calculation of the built-up object shape data $D_1$ are repeatedly performed. Therefore, it is possible to create a depositing plan in consideration of deformation due to thermal contraction while appropriately managing the inter-pass temperature Tn of the welding pass during forming of the weld bead B.

Accordingly, the additively-manufactured object W can be manufactured in consideration of deformation due to thermal contraction while appropriately managing the inter-pass temperature Tn of the welding pass during the forming of the weld bead B.

In addition, when the additively-manufactured object W is subjected to cutting processing or annealing processing, the additively-manufactured object W can be built in consideration of deformation of the additively-manufactured object W due to release strain caused by the cutting processing or the annealing processing, and when the base plate 23 is removed from the additively-manufactured object W, the additively-manufactured object W can be built in consideration of the deformation of the additively-manufactured object W due to the release strain caused by the removal of the base plate 23.

The present invention described above is not limited to the above embodiments, and combinations of the respective configurations of the embodiments, or changes and applications made by those skilled in the art based on the description of the specification and the well-known technique are also intended by the present invention and are included within the scope to be protected.

For example, in the above example, the additively-manufactured object W has a simple cylindrical shape, but the shape of the additively-manufactured object W is not limited thereto. The more complex the shape of the additively-manufactured object W is, the more significant the effects of the above-described depositing plan and manufacturing method are, and therefore, the present invention can be suitably applied.

In addition, in the example of the third depositing plan described above, a case in which the processing such as cutting or annealing and the removal of the base plate 23 are performed on the built additively-manufactured object W is exemplified, but the processing or the removal of the base plate 23 may not be performed. When the processing and the removal of the base plate 23 are not performed, only the creation of the built-up object shape data $D_1$ (S28) based on the prediction of the deformation amount due to the thermal contraction is performed in the deformation prediction processing.

As described above, the following matters are disclosed in the present specification.

(1) A depositing planning method for an additively-manufactured object, to build an additively-manufactured object using three-dimensional shape data of the additively-manufactured object by an additive manufacturing apparatus for depositing a weld bead on a base plate, in which
a computer executes:
a step of acquiring the three-dimensional shape data;
a step of creating a depositing plan that defines a welding pass for forming each layer obtained by dividing a shape of the three-dimensional shape data into layers using the weld bead, and a welding condition for forming the weld bead;
a step of setting an inter-pass time from an end of a welding pass to a start of a next welding pass for a plurality of the welding passes, and calculating an inter-pass temperature by performing heat transfer calculation in the inter-pass time;
a step of determining whether the inter-pass temperature falls within a preset inter-pass temperature range, adjusting the inter-pass time until the inter-pass temperature falls within the inter-pass temperature range, and repeating the heat transfer calculation;
a step of calculating a building time required for building the additively-manufactured object according to the inter-pass time when the inter-pass temperature falling within the inter-pass temperature range is calculated and a welding pass time required for forming the weld bead in the welding pass; and
a step of repeatedly correcting, by comparing the building time with a preset upper limit value, the welding condition in the depositing plan until the building time becomes equal to or less than the upper limit value.

According to the depositing planning method for the additively-manufactured object having this configuration, it is possible to reduce the building time by correcting the welding condition in the depositing plan while appropriately managing the inter-pass temperature of the welding pass during the forming of the weld bead.

(2) The depositing planning method for an additively-manufactured object according to (1), in which
the welding condition is corrected by correcting any one of travel speed, the number of passes, and a bead shape.

According to the depositing planning method for the additively-manufactured object having this configuration, the building time can be satisfactorily reduced by correcting the travel speed, the number of passes, or the bead shape, which is the welding condition.

(3) The depositing planning method for an additively-manufactured object according to (1) or (2), in which
the computer executes:
a step of creating built-up object shape data of the additively-manufactured object during thermal contraction based on the inter-pass time and the inter-pass temperature calculated after the heat transfer calculation is completed;
a step of calculating an excess thickness amount from a difference between a building shape of the built-up object shape data and a building shape of the three-dimensional shape data; and
a step of estimating a cutting time, which is a processing time for the additively-manufactured object, from the excess thickness amount, and
the correction is performed by adding the cutting time to the building time.

According to the depositing planning method for the additively-manufactured object having this configuration, it is possible to appropriately calculate the excess thickness amount which is a portion to be cut after the weld bead is deposited, and to reduce the total building time including the cutting time required for cutting the excess thickness portion.

(4) A depositing planning method for an additively-manufactured object, to build an additively-manufactured object using three-dimensional shape data of the additively-manufactured object by an additive manufacturing apparatus for depositing a weld bead on a base plate, in which
a computer executes:
a step of acquiring the three-dimensional shape data;
a step of creating a depositing plan that defines a welding pass for forming each layer obtained by dividing a shape of the three-dimensional shape data into layers using the weld bead, and a welding condition for forming the weld bead;
a step of setting an inter-pass time from an end of a welding pass to a start of a next welding pass for a plurality of the welding passes, and calculating an inter-pass temperature by performing heat transfer calculation in the inter-pass time;
a step of determining whether the inter-pass temperature falls within a preset inter-pass temperature range, repeating the heat transfer calculation until the inter-pass temperature falls within the inter-pass temperature range, and adjusting the inter-pass time;
a step of creating built-up object shape data of the additively-manufactured object during thermal contraction according to the inter-pass time and the inter-pass temperature calculated by the heat transfer calculation, and calculating a shape difference between a building shape of the built-up object shape data and a building shape of the three-dimensional shape data; and
a step of comparing the shape difference with a preset appropriate value, creating corrected three-dimensional shape data corrected according to the shape difference until the shape difference is smaller than the appropriate value, and repeating steps from the creation of the depositing plan to the calculation of the built-up object shape data.

According to the depositing planning method for the additively-manufactured object having this configuration, it is possible to create a depositing plan in consideration of deformation due to thermal contraction while appropriately managing the inter-pass temperature of the welding pass during the forming of the weld bead.

(5) The depositing planning method for an additively-manufactured object according to (4), in which the computer executes a step of predicting a deformation amount of the additively-manufactured object due to a release strain caused by processing of the additively-manufactured object, and correcting the built-up object shape data based on the deformation amount.

According to the depositing planning method for the additively-manufactured object having this configuration, when processing such as cutting or annealing is performed on the additively-manufactured object, the additively-manufactured object can be built in consideration of the deformation of the additively-manufactured object due to the release strain caused by the processing.

(6) The depositing planning method for an additively-manufactured object according to (4) or (5), in which the computer executes a step of predicting a deformation amount of the additively-manufactured object due to a release strain caused by removing the base plate from the additively-manufactured object, and correcting the built-up object shape data based on the deformation amount.

According to the depositing planning method for the additively-manufactured object having this configuration, when the base plate is removed from the additively-manufactured object, the additively-manufactured object can be built in consideration of the deformation of the additively-manufactured object due to the release strain caused by the removal of the base plate.

(7) A method for manufacturing an additively-manufactured object, including:

manufacturing the additively-manufactured object based on the depositing plan created by the depositing planning method for the additively-manufactured object according to any one of (1) to (6).

According to the method for manufacturing the additively-manufactured object having this configuration, it is possible to manufacture the additively-manufactured object by reducing the building time by correcting the welding condition in the depositing plan while appropriately managing the inter-pass temperature of the welding pass during the forming of the weld bead.

(8) An apparatus for manufacturing an additively-manufactured object, to build the additively-manufactured object by depositing a weld bead on a base plate using three-dimensional shape data of the additively-manufactured object, the apparatus including:

an input unit configured to acquire the three-dimensional shape data;

a depositing plan creation unit configured to create a depositing plan that defines a welding pass for forming each layer obtained by dividing a shape of the three-dimensional shape data into layers using the weld bead, and a welding condition for forming the weld bead;

a temperature prediction unit configured to set an inter-pass time from an end of a welding pass to a start of a next welding pass for a plurality of the welding passes, and calculate an inter-pass temperature by performing heat transfer calculation in the inter-pass time;

an inter-pass temperature adjustment unit configured to determine whether the inter-pass temperature falls within a preset inter-pass temperature range, change the inter-pass time until the inter-pass temperature falls within the inter-pass temperature range, and repeat the heat transfer calculation;

a building time estimation unit configured to calculate a building time required for building the additively-manufactured object according to the inter-pass time when the inter-pass temperature falling within the inter-pass temperature range is calculated and a welding pass time required for forming the weld bead in the welding pass; and a welding condition adjustment unit configured to repeatedly change, by comparing the building time with a preset upper limit value, the welding condition in the depositing plan until the building time becomes equal to or less than the upper limit value.

According to the apparatus for manufacturing the additively-manufactured object having this configuration, it is possible to manufacture the additively-manufactured object by reducing the building time by correcting the welding condition in the depositing plan while appropriately managing the inter-pass temperature of the welding pass during the forming of the weld bead.

(9) An apparatus for manufacturing an additively-manufactured object, to build the additively-manufactured object by depositing a weld bead on a base plate using three-dimensional shape data of the additively-manufactured object, the apparatus including:

an input unit configured to acquire the three-dimensional shape data;

a depositing plan creation unit configured to create a depositing plan that defines a welding pass for forming each layer obtained by dividing a shape of the three-dimensional shape data into layers using the weld bead, and a welding condition for forming the weld bead;

a temperature prediction unit configured to set an inter-pass time for a plurality of the welding passes, and calculate an inter-pass temperature by performing heat transfer calculation in the inter-pass time;

an inter-pass temperature adjustment unit configured to determine whether the inter-pass temperature falls within a preset inter-pass temperature range, repeat the heat transfer calculation until the inter-pass temperature falls within the inter-pass temperature range, and adjust the inter-pass time;

a deformation amount calculation unit configured to create built-up object shape data of the additively-manufactured object during thermal contraction according to the inter-pass time and the inter-pass temperature calculated after the heat transfer calculation is completed, and calculate a shape difference between a building shape of the built-up object shape data and a building shape of the three-dimensional shape data; and a shape difference adjustment unit configured to compare the shape difference with a preset appropriate value, create corrected three-dimensional shape data corrected according to the shape difference until the shape difference is smaller than the appropriate value, and repeat steps from the creation of the depositing plan to the calculation of the built-up object shape data.

According to the apparatus for manufacturing the additively-manufactured object having this configuration, it is possible to build the additively-manufactured object in consideration of deformation due to thermal contraction while appropriately managing the inter-pass temperature of the welding pass during the forming of the weld bead.

The present application is based on Japanese Patent Application No. 2019-147432 filed on Aug. 9, 2019, and Japanese Patent Application No. 2019-147433 filed on Aug. 9, 2019, the contents of which are incorporated herein by reference.

REFERENCE SIGNS LIST

23: base plate
31: depositing plan creation unit
33: deformation amount calculation unit
34: excess thickness amount setting unit
35: program generation unit
36: temperature prediction unit
37: storage unit
38: building time estimation unit
39: input unit
40: display unit
100: apparatus for manufacturing additively-manufactured object
B: weld bead
$D_0$: three-dimensional shape data
$D_1$: built-up object shape data
$D_2$: corrected three-dimensional shape data
Tn: inter-pass temperature
ta: building time
tc: cutting time
tpn: welding pass time
tn: inter-pass time
W: additively-manufactured object
Δ: excess thickness amount
δ: near net value (appropriate value)

The invention claimed is:

1. A depositing planning method for an additively-manufactured object, to build an additively-manufactured object using three-dimensional shape data of the additively-manufactured object by an additive manufacturing apparatus for depositing a weld bead on a base plate, wherein
a computer executes:
a step of acquiring the three-dimensional shape data;
a step of creating a depositing plan that defines a welding pass for forming each layer obtained by dividing a shape of the three-dimensional shape data into layers using the weld bead, and a welding condition for forming the weld bead;
a step of setting an inter-pass time from an end of a welding pass to a start of a next welding pass for a plurality of the welding passes, and calculating an inter-pass temperature by performing heat transfer calculation in the inter-pass time;
a step of determining whether the inter-pass temperature falls within a preset inter-pass temperature range, adjusting the inter-pass time until the inter-pass temperature falls within the inter-pass temperature range, and repeating the heat transfer calculation;
a step of calculating a building time required for building the additively-manufactured object according to the inter-pass time when the inter-pass temperature falling within the inter-pass temperature range is calculated and a welding pass time required for forming the weld bead in the welding pass;
a step of repeatedly correcting, by comparing the building time with a preset upper limit value, the welding condition in the depositing plan until the building time becomes equal to or less than the upper limit value;
a step of creating an operation program based on the depositing plan including the corrected welding condition; and
a step of sending commands to perform additive manufacturing according to the operation program.

2. The depositing planning method for an additively-manufactured object according to claim 1, wherein
the welding condition is corrected by correcting any one of travel speed, the number of passes, and a bead shape.

3. The depositing planning method for an additively-manufactured object according to claim 1, wherein
the computer executes:
a step of creating built-up object shape data of the additively-manufactured object during thermal contraction based on the inter-pass time and the inter-pass temperature calculated after the heat transfer calculation is completed;
a step of calculating an excess thickness amount from a difference between a building shape of the built-up object shape data and a building shape of the three-dimensional shape data; and
a step of estimating a cutting time, which is a processing time for the additively-manufactured object, from the excess thickness amount, and
the correction is performed by adding the cutting time to the building time.

4. The depositing planning method for an additively-manufactured object according to claim 2, wherein
the computer executes:
a step of creating built-up object shape data of the additively-manufactured object during thermal contraction based on the inter-pass time and the inter-pass temperature calculated after the heat transfer calculation is completed;
a step of calculating an excess thickness amount from a difference between a building shape of the built-up object shape data and a building shape of the three-dimensional shape data; and
a step of estimating a cutting time, which is a processing time for the additively-manufactured object, from the excess thickness amount, and
the correction is performed by adding the cutting time to the building time.

5. A method for manufacturing an additively-manufactured object, comprising:
providing the base plate,
depositing the weld bead on the base plate to create the object based on the operation program created by the depositing planning method for the additively-manufactured object according to claim 1.

6. A depositing planning method for an additively-manufactured object, to build an additively-manufactured object using three-dimensional shape data of the additively-manufactured object by an additive manufacturing apparatus for depositing a weld bead on a base plate, wherein
a computer executes:
a step of acquiring the three-dimensional shape data;
a step of creating a depositing plan that defines a welding pass for forming each layer obtained by dividing a shape of the three-dimensional shape data into layers using the weld bead, and a welding condition for forming the weld bead;
a step of setting an inter-pass time from an end of a welding pass to a start of a next welding pass for a plurality of the welding passes, and calculating an inter-pass temperature by performing heat transfer calculation in the inter-pass time;
a step of determining whether the inter-pass temperature falls within a preset inter-pass temperature range, repeating the heat transfer calculation until the interpass temperature falls within the inter-pass temperature range, and adjusting the inter-pass time;

a step of creating built-up object shape data of the additively-manufactured object during thermal contraction according to the inter-pass time and the inter-pass temperature calculated by the heat transfer calculation, and calculating a shape difference between a building shape of the built-up object shape data and a building shape of the three-dimensional shape data;

a step of comparing the shape difference with a preset appropriate value, creating corrected three-dimensional shape data corrected according to the shape difference until the shape difference is smaller than the appropriate value, and repeating steps from the creation of the depositing plan to the calculation of the built-up object shape data;

a step of creating an operation program based on the depositing plan created from the corrected three-dimensional shape data; and a step of sending commands to perform additive manufacturing according to the operation program.

7. The depositing planning method for an additively-manufactured object according to claim 6, wherein the computer executes a step of predicting a deformation amount of the additively-manufactured object due to a release strain caused by processing of the additively-manufactured object, and correcting the built-up object shape data based on the deformation amount.

8. The depositing planning method for an additively-manufactured object according to claim 6, wherein the computer executes a step of predicting a deformation amount of the additively-manufactured object due to a release strain caused by removing the base plate from the additively-manufactured object, and correcting the built-up object shape data based on the deformation amount.

9. The depositing planning method for an additively-manufactured object according to claim 7, wherein the computer executes a step of predicting a deformation amount of the additively-manufactured object due to a release strain caused by removing the base plate from the additively-manufactured object, and correcting the built-up object shape data based on the deformation amount.

10. A method for manufacturing an additively-manufactured object, comprising:

providing the base plate, depositing the weld bead on the base plate to create the object based on the operation program created by the depositing planning method for the additively-manufactured object according to claim 6.

11. An apparatus for manufacturing an additively-manufactured object, to build the additively-manufactured object by depositing a weld bead on a base plate using three-dimensional shape data of the additively-manufactured object, the apparatus comprising:

an input unit configured to acquire the three-dimensional shape data;

a depositing plan creation unit configured to create a depositing plan that defines a welding pass for forming each layer obtained by dividing a shape of the three-dimensional shape data into layers using the weld bead, and a welding condition for forming the weld bead;

a temperature prediction unit configured to set an inter-pass time from an end of a welding pass to a start of a next welding pass for a plurality of the welding passes, and calculate an inter-pass temperature by performing heat transfer calculation in the inter-pass time;

an inter-pass temperature adjustment unit configured to determine whether the inter-pass temperature falls within a preset inter-pass temperature range, change the inter-pass time until the inter-pass temperature falls within the inter-pass temperature range, and repeat the heat transfer calculation;

a building time estimation unit configured to calculate a building time required for building the additively-manufactured object according to the inter-pass time when the inter-pass temperature falling within the inter-pass temperature range is calculated and a welding pass time required for forming the weld bead in the welding pass;

a welding condition adjustment unit configured to repeatedly change, by comparing the building time with a preset upper limit value, the welding condition in the depositing plan until the building time becomes equal to or less than the upper limit value; and a control unit configured to create an operation program based on the depositing plan including the changed welding condition and send commands to perform additive manufacturing according to the operation program.

* * * * *